Patented May 20, 1930

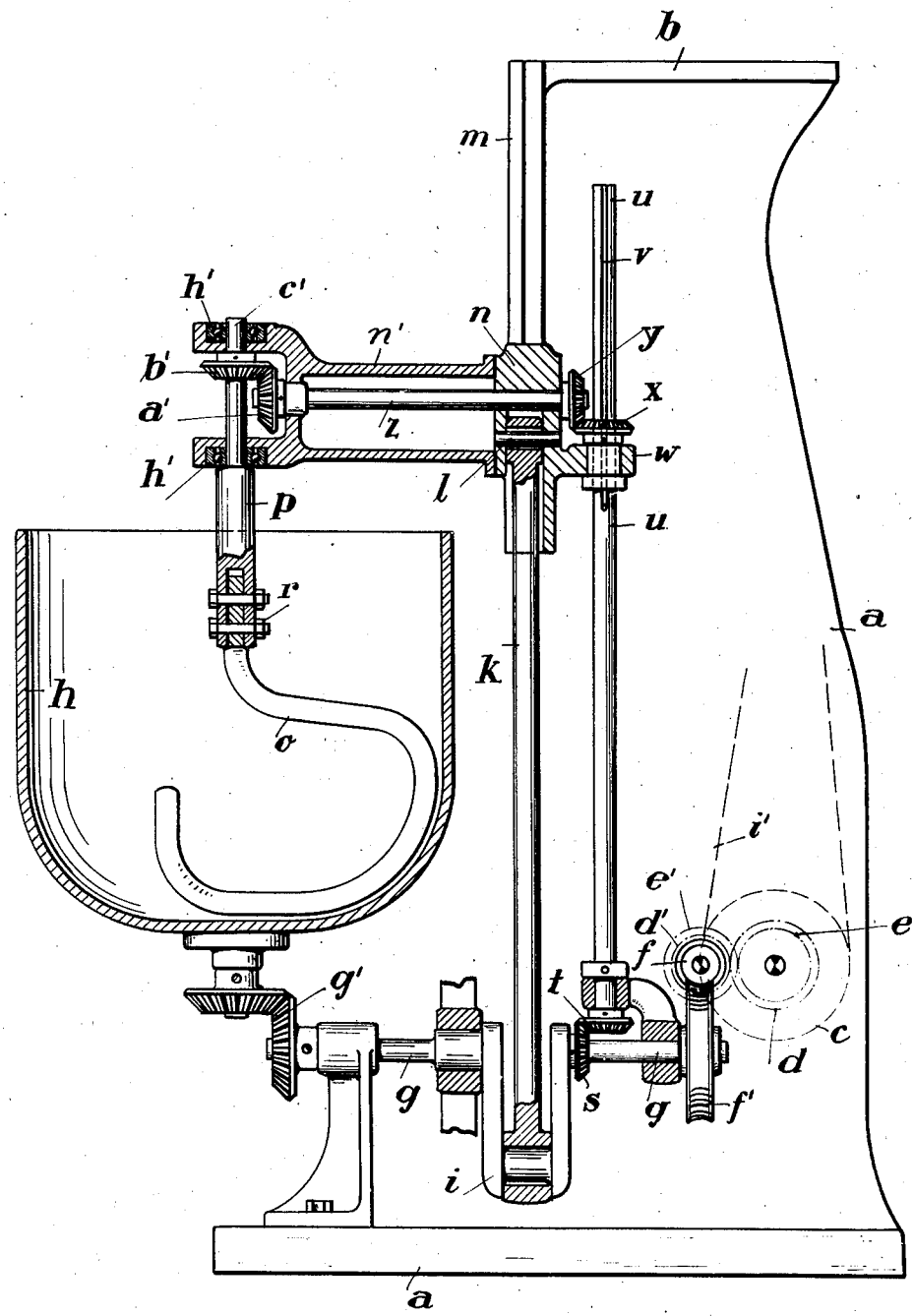

1,759,137

UNITED STATES PATENT OFFICE

RICHARD SARTOR, OF WAHLBACH, NEAR BURBACH, WESTPHALIA, GERMANY

DOUGH-KNEADING MACHINE

Application filed June 17, 1929, Serial No. 371,531, and in Germany December 19, 1928.

This invention relates to a dough kneading machine and consists essentially in the provision of a kneading arm arranged in a revolving trough and being itself capable of rotation about a vertical axis as well as of vertical reciprocating movement, means being provided for rotating the arm through one revolution during each up and down movement of the same.

Owing to this combined movement of the arm, the kneading operation will not only be more than usually intensive but it will tend to produce a more porous and firmer dough.

The invention is illustrated in the accompanying drawing which represents a vertical section of the machine.

The machine comprises a frame casting $a$ which is adapted to support a driving motor and which carries in suitable bearings a crank shaft $g$. The latter is fitted with a worm wheel $f'$ whereby it receives motion from a worm $f$. The shaft whereon the arm is mounted is provided with two pinions $e'$ and $d'$ of different diameters, and another shaft, which receives motion from the motor through the medium of a belt $i'$, carries two gear wheels $e$ and $d$ adapted, on being axially displaced, to be thrown into gear with the pinions $e'$ and $d'$ respectively for imparting motion to the crank shaft at different speeds.

The kneading trough $h$ is mounted rotatably, in known manner, in a separate frame and is adapted to receive motion from the crank shaft $g$ through the medium of conical gears $g'$. The kneading arm $o$ is carried by a vertical shaft $p$ to which it is secured by means of screw bolts $r$. The shaft $p$ has a reduced portion $c'$ whereby it is mounted in ball bearings $h'$, $h'$ in a bracket $n'$ which overhangs the trough and which is connected to a slide $n$. The latter is adapted to move along a vertical guide $m$ on the machine frame and is connected by means of a gudgeon pin $l$ and a rod $k$ to the crank $i$ of the shaft $g$ so as to be reciprocated by the latter. The frame also supports a vertical shaft $u$ which receives motion from the crank shaft through the medium of conical gears $s$ and $t$. A conical gear $x$ which is held in a bearing $w$ on the slide $n$, is slidably feathered on the shaft $u$ and transmits motion, through the medium of conical gears $y$, to a horizontal shaft $z$ mounted in the bracket $m'$. Another conical gear $a'$ on the shaft $z$ meshes with a gear $b'$ on the shaft portion $c'$ of the kneading arm so as to impart rotation to the latter. The arrangement is such that the arm $o$ will be rotated through one revolution while it is reciprocated once up and down by the bracket $m'$.

The kneading arm $o$ is shaped in conformity with the bottom outline of the trough $h$ and is adapted to contact with or graze the bottom in its lowermost position. As the arm rises with the bracket $m'$ it keeps in contact with the sides of the trough so that all parts of the latter will be cleared of dough. The arm is arranged unsymmetrically relative to the supporting shaft and extends through about two-thirds of the diameter of the trough. This arrangement ensures an effective kneading of all parts of the dough.

The two sets of gears $d$, $e$, and $d'$, $e'$ allow the arm to be always rotated at the speed which suits the work, for instance normally at the rate of about 25 revolutions a minute and about 37 revolutions for small quantities and for leavening.

I claim:

1. A dough kneading machine comprising a revolving trough, a kneading arm in said trough, means for reciprocating the arm vertically in the trough, and means for rotating the arm about a vertical axis through one revolution during each up and down movement.

2. A dough kneading machine as claimed in claim 1 wherein the arm is shaped in conformity with the bottom outline of the trough and supported so as to contact with the bottom and side of the trough in its lowermost position, the sides of the trough being vertical so as to remain in contact with the arm during its up and down movement.

3. A dough kneading machine comprising a frame, a crank shaft in said frame, means for imparting motion at different speeds to said shaft, a rotatable trough geared to said crank shaft so as to be rotated thereby, a slide guided vertically on the frame, a rod connecting the crank of said shaft with the slide so as to reciprocate the latter, a bracket connected to the slide and overhanging the trough, a kneading arm situated within the trough and carried by said bracket so as to follow its reciprocating movements and so as to be capable of rotation about a vertical axis, a vertical shaft geared to the crank-shaft, a conical gear carried by the bracket and slidably feathered on said vertical shaft, a horizontal shaft covered by the bracket and connected to said conical gear so as to receive motion therefrom, and gears connecting said horizontal shaft to the kneading arm so as to impart rotation to the arm through one revolution during each up and down movement thereof.

RICHARD SARTOR.